(12) United States Patent
Bronstein (10) Patent No.: US 7,705,848 B2
(45) Date of Patent: Apr. 27, 2010

(54) METHOD OF IDENTIFYING SEMANTIC UNITS IN AN ELECTRONIC DOCUMENT

(75) Inventor: Serge Bronstein, Raanana (IL)

(73) Assignee: PDFlib GmbH, Munich (DE)

( * ) Notice: Subject to any disclaimer, the term of this patent is extended or adjusted under 35 U.S.C. 154(b) by 1044 days.

(21) Appl. No.: 11/405,782

(22) Filed: Apr. 18, 2006

(65) Prior Publication Data

US 2007/0002054 A1 Jan. 4, 2007

(30) Foreign Application Priority Data

Jul. 1, 2005 (EP) .................................. 05014369

(51) Int. Cl.
G06T 11/20 (2006.01)
G06T 11/00 (2006.01)
G06K 9/00 (2006.01)

(52) U.S. Cl. ..................... 345/442; 345/467; 382/159

(58) Field of Classification Search .............. 345/442, 345/467; 235/494; 709/217, 203, 247; 358/3.26; 382/100, 306, 159

See application file for complete search history.

(56) References Cited

U.S. PATENT DOCUMENTS

| | | | | |
|---|---|---|---|---|
| 5,416,898 A | * | 5/1995 | Opstad et al. ............... | 345/468 |
| 5,832,530 A | * | 11/1998 | Paknad et al. ............... | 715/235 |
| 5,870,084 A | * | 2/1999 | Kanungo et al. ............. | 345/551 |
| 6,327,393 B1 | * | 12/2001 | Bruder ........................ | 382/256 |
| 2004/0202352 A1 | * | 10/2004 | Jones et al. .................. | 382/114 |
| 2004/0205568 A1 | * | 10/2004 | Breuel et al. ................. | 715/513 |

FOREIGN PATENT DOCUMENTS

EP 0 702 322 A 3/1996

OTHER PUBLICATIONS

European Search Report for Parent Application Serial No. EP 05 01 4369, Dated Dec. 7, 2005 (3 Pages).
Hui Chao et al: "Layout and content extraction for PDF documents" Document Analysis Systems VI. 6th International Workshop, DAS 2004. Proceedings (Lecture Notes in Comput. Sci. vol. 3163) Springer-Verlag Berlin, Germany, 2004, pp. 213-224, XP002357643, ISBN: 3-540-23060-2, Dec. 10, 2004.

(Continued)

Primary Examiner—Amare Mengistu
Assistant Examiner—Aaron M Guertin
(74) Attorney, Agent, or Firm—Jansson, Shupe & Munger Ltd.

(57) ABSTRACT

A method of identifying semantic units in an electronic document includes the steps of: providing an electronic document being described in a page description language, the document having at least one page having a plurality of text fragments, each text fragment including a plurality of glyphs that have not been identified as semantic units, the document further including geometric information and page description language parameters; determining strips of at least one glyph by comparing the geometric position of subsequent glyphs; determining zones of at least one strip wherein a zone is defined by the combined area of strips, the geometrical areas of which overlap with each other; determining a boundary between two semantic units in a zone based on the geometric properties of the glyphs; sorting the identified semantic units in the zone in a sorted list; and, combining subsequent semantic units in the sorted list according to geometric considerations.

10 Claims, 9 Drawing Sheets

OTHER PUBLICATIONS

Simon A. et al: "A Fast Algorithm for Bottom-Up Document Layout Analysis" IEEE Transactions on Pattern Analysis and Machine Intelligence, IEEE Service Center, Los Alamitos, CA, US, vol. 19, No. 3, Mar. 1997, pp. 273-277, XP000686654, ISSN: 0162-8828.

Lovegrove W S et al: "Document analysis of PDF files: Methods, Results and Implications" Electronic Publishing: Origination, Dissemination and Design Wiley UK, vol. 8, No. 2-3, Jun. 1995, pp. 207-220, XP002357644, ISSN: 0894-3982. Retrieved from the Internet: URL: <http://cajun.cs.nott.ac.uk/compsci/epo/papers/volume8/issue2/2point26.pdf>.

Hadjar K et al: "Xed: A New Tool for Extracting Hidden Structures from Electronic Documents" Document Image Analysis for Libraries 2004. Proceedings, First International Workshop on Palo Alto, CA, USA Jan. 23-24, 2004, Los Alamitos, CA, USA, IEEE Comput. Soc, US, Jan. 23, 2004, pp. 212-224, XP010681130, ISBN: 0-7695-2088-X.

* cited by examiner

METHOD OF IDENTIFYING SEMANTIC UNITS IN AN ELECTRONIC DOCUMENT

CROSS REFERENCE TO RELATED APPLICATION

This application claims the benefit under 35 U.S.C. §119 of European application EP 05 014 369.2, filed Jul. 1, 2005.

FIELD OF THE INVENTION

The present invention relates to a method of identifying semantic units or words in an electronic document and, more specifically, to such a method where the document is described in a page description language.

BACKGROUND OF THE INVENTION

In addition to producing physical renderings of digital documents (e.g., paper prints), exchanging and archiving the digital documents themselves plays an increasing role in business as well as private communications. In order to facilitate exchange and provide universal access regardless of computer system and application, general page description languages are used instead of native word processor formats for exchanging digital documents. In order to reuse the text content of digital documents for archiving, indexing, searching, editing, and other purposes which are not related to producing a visual rendering of the page, it is desirable to identify the logical (reading) order of the text as well as semantic units (words of natural languages).

Page description languages, such as the Portable Document Format (PDF), PostScript, and PCL, provide the semantics of individual text characters as well as their position on the page. However, they generally do not convey information about words and other semantic units. The fragments comprising the text on a page may contain individual characters, syllables, words, lines, or an arbitrary mixture thereof, without any explicit marks designating the start or end of a word.

To make matters worse, the ordering of text fragments on the page may be different from the logical (reading) order. There are no rules for the order in which portions of text are placed on the page. For example, a page containing two columns of text might be produced by creating the first line in the left column, followed by the first line of the right column, the second line of the left column, the second line of the right column, etc. However, logical order requires all text in the left column to be processed before the text of the right column is processed. Extracting text from such documents by simply replaying the instructions of the page description language, and storing the characters instead of rendering them on a visual page, generally provides undesirable results since the logical structure of the text is lost.

In the following description, the terms "character" and "glyph" are used; it is important to distinguish both concepts. "Characters" are the smallest units which convey information in a language. Common examples are the letters of the Latin alphabet, Chinese ideographs, and Japanese syllables. Characters have a meaning; they are semantic entities. The known Unicode standard encodes characters. "Glyphs" are different graphical variants which represent one or more particular characters. Glyphs have an appearance; they are representational entities. Fonts are used to produce visual representations of glyphs (see description of glyph metrics below). There is no one-to-one relationship between characters and glyphs. For example, a ligature is a single glyph which corresponds to two or more separate characters.

Page description languages such as PDF offer a variety of operators for placing text on the page. The order of text and grouping of glyphs into fragments is completely up to the application creating the PDF. The PDF file format neither mandates nor guarantees any particular ordering of the text contents comprised in a page. Although PDF guarantees the faithfulness of the final visual representation of the page, a certain visual result may be achieved by many different combinations of page marking operators.

Figure 8:
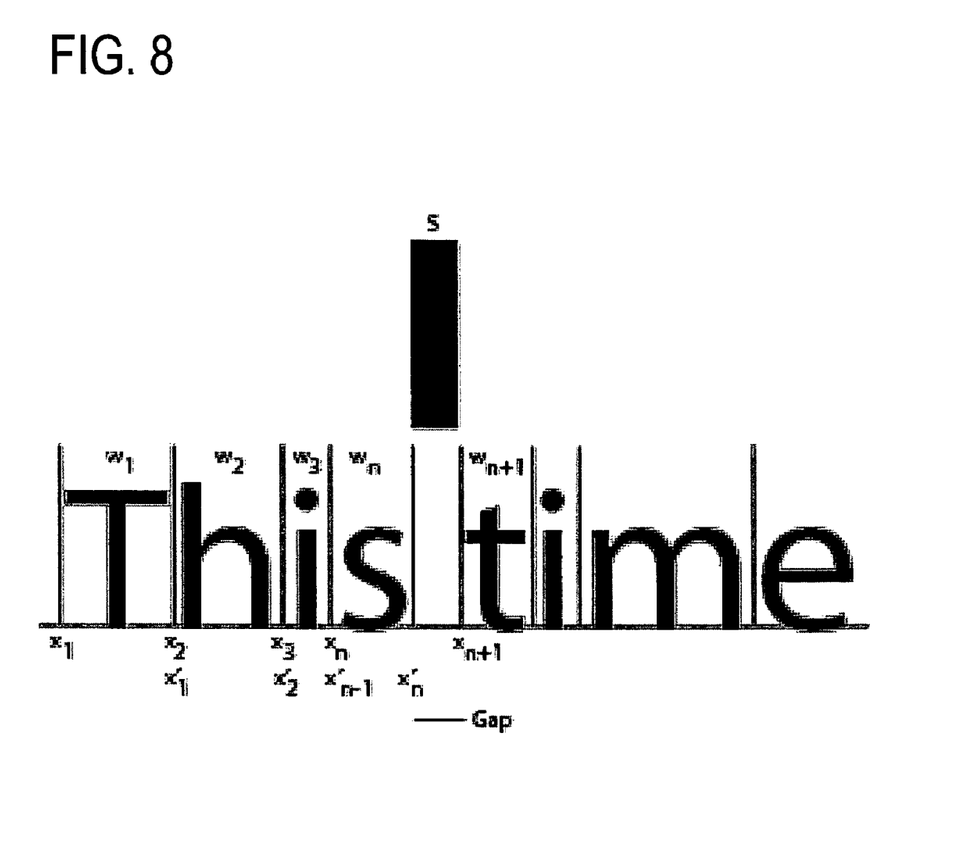
FIG. 8 shows the graphical details of an exemplary semantic unit without additional character spacing.

Some of these combinations may be related to the logical (reading) order of the text, while others may disturb or even invert the logical order. As an example, the text "This time" shown in FIG. 8 could be created by the following sequence in the page description which happens to contain the text in its logical order, and even includes a space character between words. In the PDF context, the numbers are x-y coordinates interpreted by the Td operator, whereas the text in parentheses is each interpreted by the operator Tj:

50 700 Td (This)Tj (time)Tj

In this exemplary situation, extracting text and identifying word boundaries would be a trivial task. However, the exact same visual result could also be created by the following exemplary sequence in the page description:

102 700 Td (time)Tj −52 0 Td (This)Tj

Although the visual page will look the same, the words comprising the text appear in inverted order in the page description, and a space character between the words is no longer present.

In the next exemplary combination there are no longer any words which could be identified directly in the page description, although the visual output is still exactly the same:

134 700 Td (e)Tj −20 0 Td (m)Tj −5.32 0 Td (i)Tj
−6.68 0 Td (t)Tj −18.664 0 Td (s)Tj −5.336 0 Td
(i)Tj −13.336 0 Td (h)Tj −14.664 0 Td (T)Tj

Not only are there no longer any identifiable words, but the reading order of the characters comprising the two words is actually inverted.

To make matters worse, arbitrary mixtures of such output ordering schemes may be present in an electronic document. While it may seem pointless to create such output, it is actually very common due to the characteristics of the software creating the output. For example, a product may first create all text fragments on the page which are printed in one font, and then proceed with all text fragments in the second font, etc. Another product may proceed through all text fragments depending on their color (first all black fragments, then all red fragments, etc.). Still another product could produce output according to the order in which a human typed and edited the text: a word which has been added to the first line after many lines have been typed may appear later in the page description than the remainder of the first line.

EP 0 702 322 B1 describes a system and method of identifying words in a portable electronic format by the steps of: receiving a text segment from a page of a document having multiple text segments and associated position data including x and y coordinates for each text segment, creating a text object for each text segment, entering the text objects into a linked list, and identifying words from the linked list through analysis of the text objects for word breaks and through analysis of gaps between text objects using the associated position data. However, the method described therein in many cases gives poor results due to the following reasons. Documents with a more sophisticated structure such as documents with multiple columns are not processed correctly due to the fact that words belonging to one column are not grouped in the correct semantic order thus providing wrong results. A further problem of the above mentioned document is its disability of identifying spaced out characters as one associated semantic unit.

It is therefore an object of the present invention to provide a fast, reliable and error-proof method of reconstructing the semantic contents of a page, and a method of grouping characters into semantic units (words) to facilitate processing the textual contents of digital documents for editing, searching and similar tasks.

SUMMARY OF THE INVENTION

According to an aspect of the invention, a method of identifying words in an electronic document includes the steps of:

a) providing an electronic document being described in a page description language, the document including at least one page having a plurality of text fragments, each text fragment including a plurality of glyphs that have not been identified as semantic units, the document further comprising geometric information including position and width of all text fragments on the page and page description language parameters such as font size, character spacing, text distortion of all glyphs;

b) determining a strip as a geometrical area of at least one glyph by comparing the geometric position of each glyph with the subsequent glyph in the page description, wherein every two glyphs are considered part of one strip if (i) the difference of their vertical coordinates is smaller than a first predetermined value, and if (ii) the difference of their horizontal coordinates is greater than zero, and smaller than a second predetermined value;

c) determining a zone of at least one strip wherein a zone is defined by the combined area of strips that overlap with each other;

d) determining a potential boundary between two semantic units in a zone, including the steps of:
 i) defining a list of glyphs in a zone according to their location in the page description with associated font characteristics and geometric position;
 ii) identifying the presence of a potential boundary between semantic units between two glyphs if the difference between the vertical coordinate of a selected glyph and the vertical coordinate of the preceding glyph is larger than a third predetermined value; and/or
 iii) defining a space box of rectangular shape for each font/encoding combination used in the document, the width of the space box being defined as the width of an existing or hypothetical space glyph for the corresponding font size, and identifying the presence of a potential boundary between semantic units, if the distance between a selected glyph and the preceding glyph equals the width of the space box or exceeds it by a fourth predetermined value, thereby rendering a potential semantic unit; and
 iv) repeating steps i) to iii) until the end of the glyph list has been reached, e) sorting the identified potential semantic units in the zone according to the vertical position and, if the vertical positions differ by at most a fifth predetermined value, according to the horizontal position, whereby a sorted list of potential semantic units is provided, f) processing the sorted list of potential semantic units by combining two potential semantic units if the distance between the last glyph of a first potential semantic unit and the first glyph of the next potential semantic unit is smaller than the sum of the width of the space box and a sixth predetermined value, until the end of the list has been reached, thereby rendering a sorted list of finally identified semantic units in the zone, and g) repeating steps d) to f) until all zones have been processed.

BRIEF DESCRIPTION OF THE DRAWING FIGURES

Further objects, features and advantages of the invention may become apparent from the detailed description of preferred embodiments and the enclosed drawings, wherein.

DETAILED DESCRIPTION OF PREFERRED EMBODIMENTS

Glyph Metrics

Figure 1:
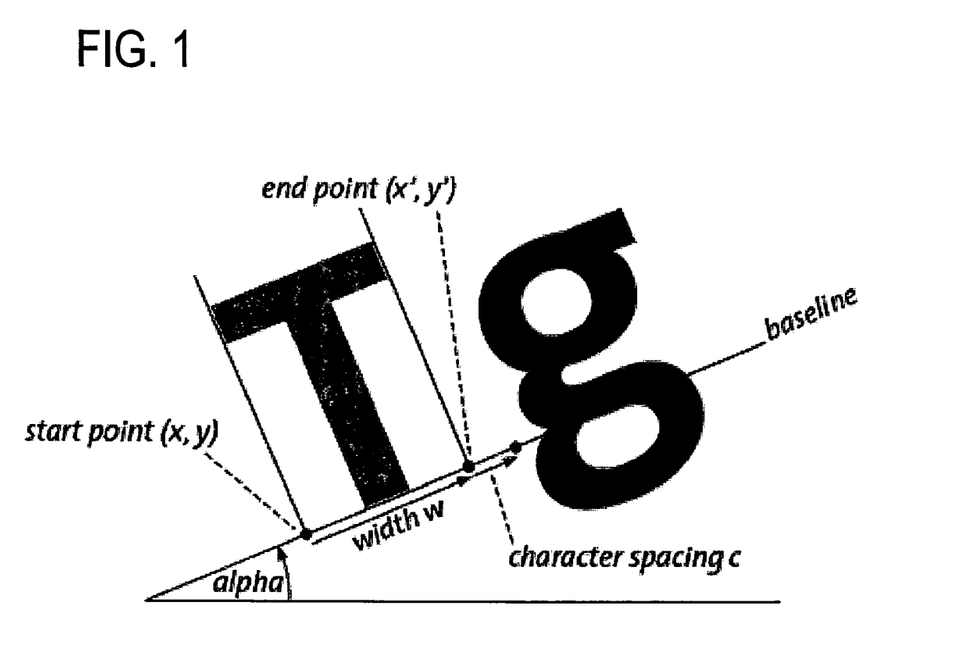
FIG. 1 shows a schematic diagram of general glyph metrics.
Figure 2:
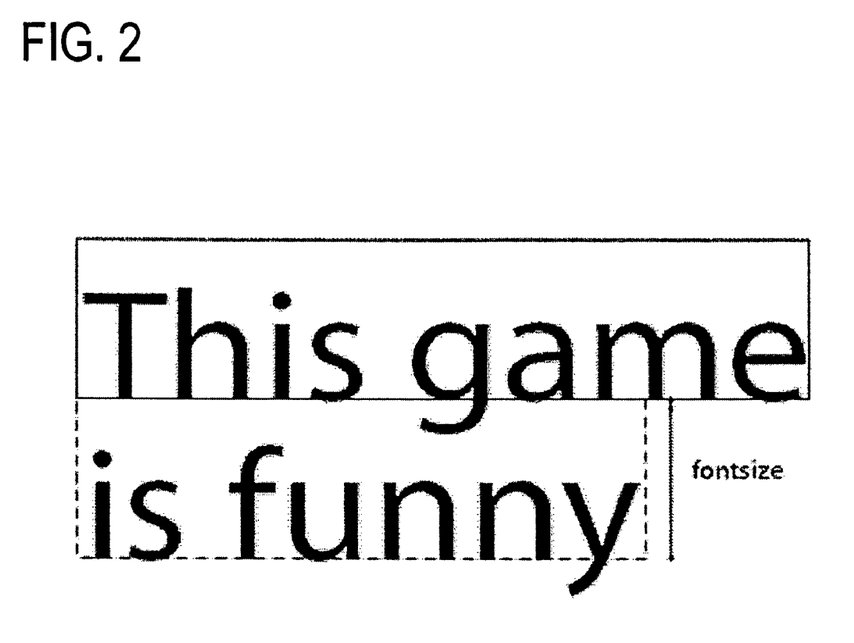
FIG. 2 shows a schematic diagram illustrating the font size of a specific font.

In FIGS. 1 and 2, general glyph metrics used in the method according to the invention are illustrated. As shown in FIG. 1, every glyph on the page has a position (x, y) which is measured at its start point and a glyph width w which is derived from the font metrics and the text parameters. The angle "alpha" is the angle of the text baseline on which the glyph is based. Contrary to the example shown in FIG. 1, "alpha" will be "0" in most cases, i.e., the glyph is displayed in a line horizontally on the page. Applying the width w at (x, y) in direction "alpha" yields the end point (x', y') of the glyph. Since a character spacing c may have been specified to increase or decrease the space between glyphs, the end point (x', y') of the previous glyph is not necessarily identical to the start point of the next glyph. The character spacing c may be set individually for each glyph (e.g., to achieve kerning, or tighter spacing for certain critical pairs such as "Ty" in some fonts), or it may be applied to all glyphs in a word to emphasize the word (positive character spacing) or save space in the layout (negative character spacing). All values required for glyph metrics can be derived from the page description by applying methods well known to those skilled in the art.

Referring to FIG. 2, the font size is shown as defined in the PostScript and PDF page description languages, where the font size cannot be directly measured on a particular glyph. Instead, the font size is taken as the minimum distance between adjacent baselines, which ensures that descenders in the first line will not overlap any ascenders in the second line.

Although the ratio of font size and ascenders/descenders is font-specific and subject to design decisions, it is generally chosen such that extreme ascenders (e.g., Ä) will touch extreme descenders (e.g., j, g) when the distance between baselines exactly equals the font size (i.e., there will not be any overlap nor white space between the descenders and ascenders). As a consequence, generally all glyphs in a font have a height which is considerably smaller than the value of the font size (typically 60%-80%), as can be seen in FIG. 2.

According to the invention, a "glyph box" is a quadrilateral which is located on the baseline where two corners are determined by the glyph's start and end point, i.e., the width of the glyph box is determined by the glyph's start point, and its end point. The height of the glyph box is determined by the font size of the glyph, where some correctional factor can be applied to take into account varying inter-line spacing. Typical values for this factor are in the range between 1.0 and 2.0. For rotated or skewed text, the respective rotation and skewing angles are also applied to the glyph box.

According to the invention, a so-called "space box" is calculated for each font/encoding combination used in the document. The space box is a rectangle with the font size as height. The width of the rectangle is based on the width of an existing or hypothetical space glyph for a given font size. If the font contains a space glyph, its width is used directly, otherwise an approximation is calculated based on general properties of the font. The relevant geometric parameters (such as horizontal scaling and character spacing) of the preceding glyph are applied to the space width to determine the width of the space box. When multiple glyphs are involved and a space box is required, the space box is determined according to the font and font size which is used for the majority of the glyphs.

General Method

A preferred embodiment of a method according to the invention converts a list of glyphs on the page into a highly structured list of zones, where each zone contains a list of words. An exemplary method according to the invention has the steps illustrated in FIG. 3. Details on the steps are now provided. In step 10, a list of all glyphs on the page is obtained, along with their position on the page. This step is performed according to the underlying page description language. It is preferred that the underlying page description contains all Unicode values for all glyphs on the page, since providing all Unicode values will lead to better results in the overall method. However, practical experience has shown that it can be difficult if not impossible to try to obtain 100% of Unicode values (since required information may be missing from the document). In any case, a method according to the invention will provide superior results even without all Unicode values.

Figure 3:
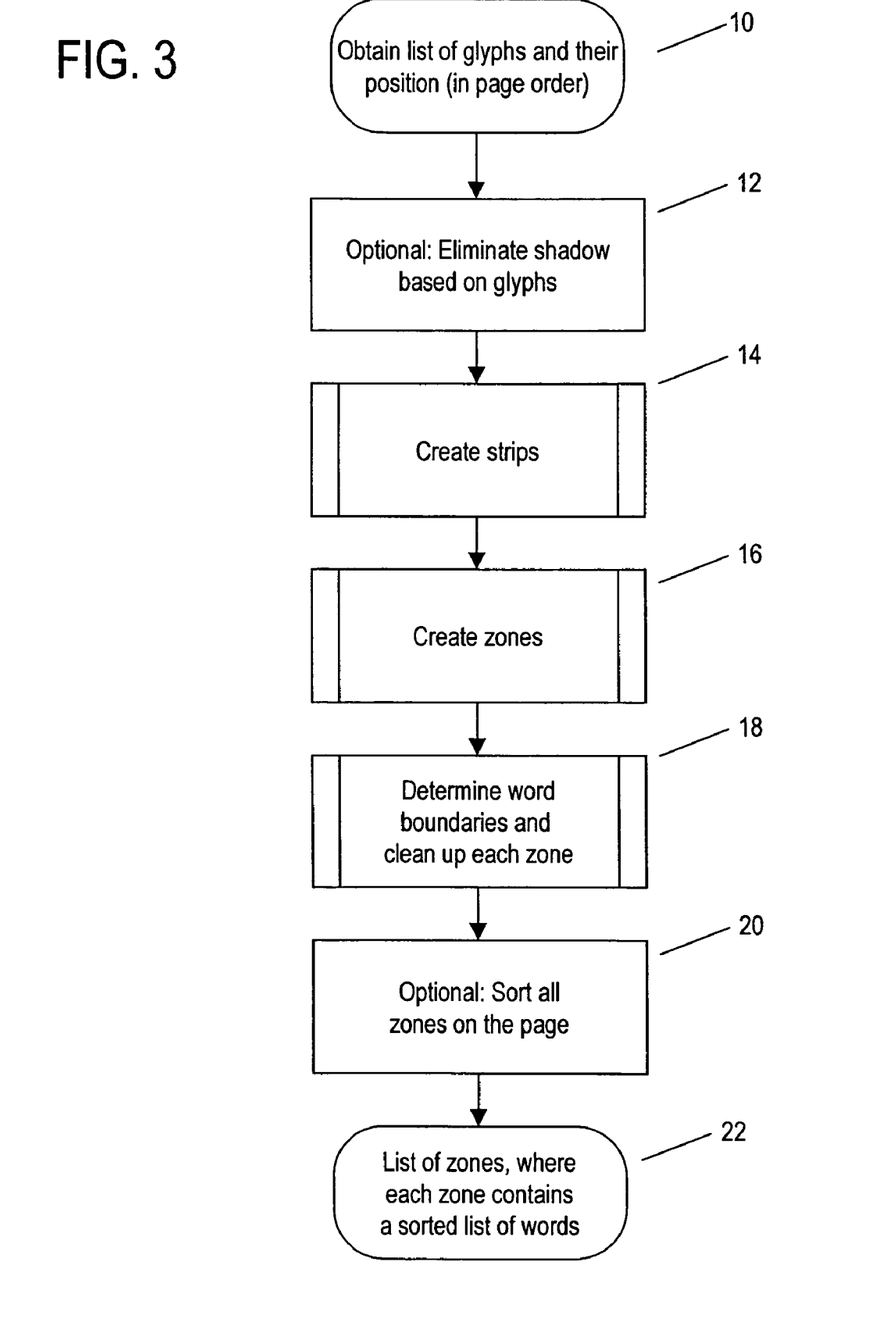
FIG. 3 shows a flow chart illustrating the major steps of a preferred method of identifying semantic units in an electronic document according to an exemplary embodiment of the invention.

The optional step 12 eliminates one or more glyph of subsequent glyphs in the page description representing redundant text, such as shadow or artificial bold text. Achieving the step of shadow removal has been the subject of various studies, and up to now more and more sophisticated studies for this problem have been provided. The present invention is not directed to this problem, but may use any of the methods known to those skilled in the art.

In step 14 a list of strips is created from the list of glyphs. In simple page layouts a strip can be considered a single line of text. More details about step 14 are described below. In step 16 a list of zones is created from the list of strips. In simple page layouts a zone can, for example, be considered a single column of text. In step 18 the contents of each zone are processed in order to determine word boundaries (group glyphs into semantic units) and eliminate redundant content. The latter includes elimination of shadow and artificial bold text and the recombination of hyphenated words. The result for each zone is a sorted list of words on the page. A more detailed description of steps 16 and 18 can also be found below. Subsequently, in step 20 all zones on the page may be sorted according to their x/y position, and thus a list of zones is achieved in step 22 containing a sorted list of words. Accordingly, all words on the page have been identified and sorted.

Creating Strips from Glyphs (Step 14)

A "strip" is a polygonal area on the page, comprising the union of glyph boxes corresponding to the glyphs in the strip. In a simplified version, a quadrilateral bounding box of the strip may be used instead of the polygonal strip. Although the strips created in this step are not useful semantic units themselves, they form the basis for creating zones of text on the page. An exemplary method of creating strips includes the steps illustrated in FIG. 4. Details on the steps are provided below.

Figure 4:
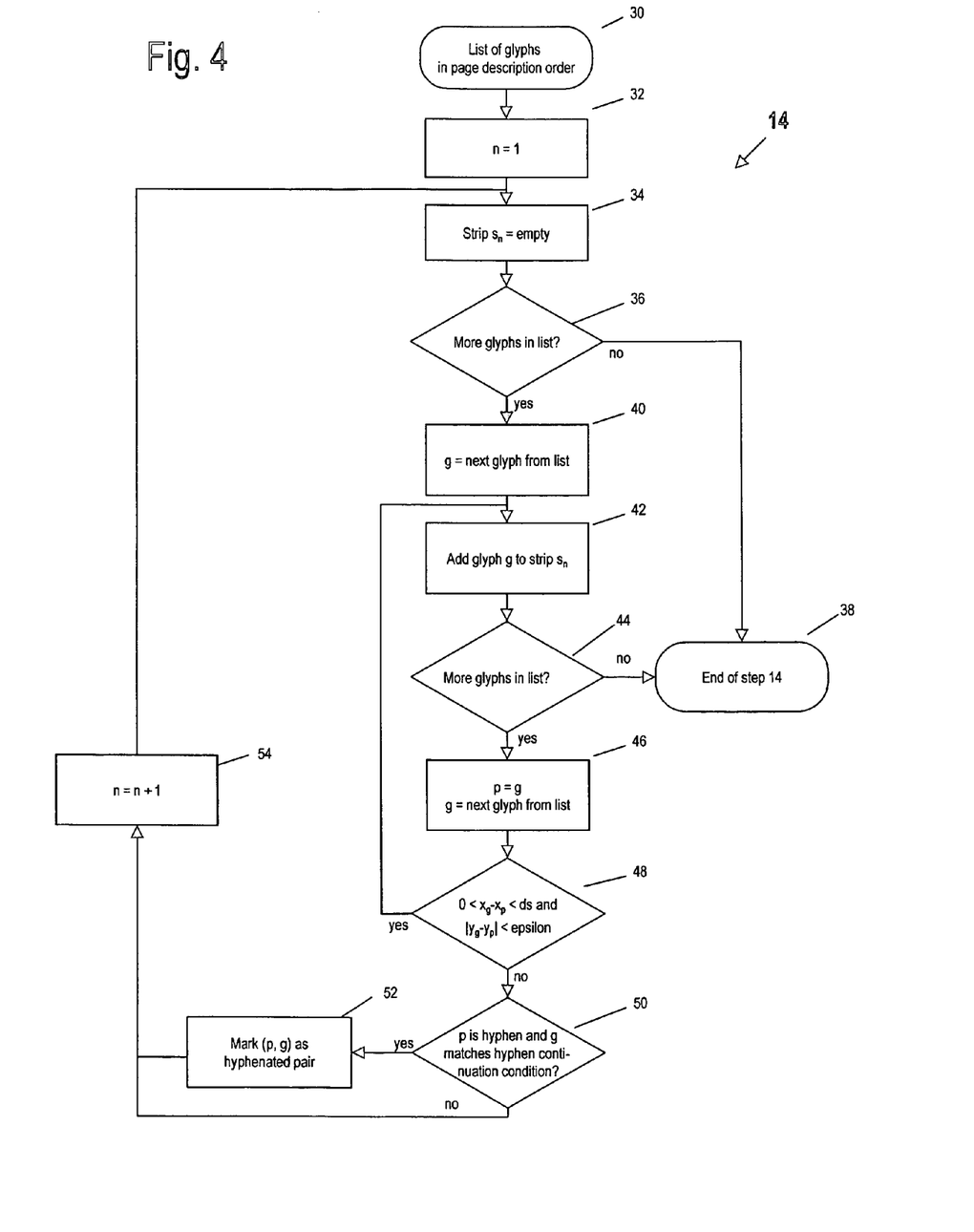
FIG. 4 shows a flow chart representing the detailed procedural steps for creating strips in step 14 of FIG. 3.

The method starts in step 30 with a list of glyphs on the page, where the glyphs are provided in the order in which they appear in the page description. As explained above, there is no particular relationship between the glyph order and their semantics. For example, the glyphs comprising a word may be scattered across the page description without any relationship. In step 32 the counter n, which counts the strips identified on the page, is set to 1. In step 34 the strip $s_n$ is initialized to an empty strip. In step 36 it is determined whether there are more glyphs available in the list. If there are no more glyphs available the method is stopped in step 38.

If more glyphs are available in the list the method proceeds to step 40, where the next available glyph is assigned to g. In step 42 g is added to strip $s_n$. In step 44 it is again determined whether there are more glyphs available in the list. If there are no more glyphs available the method is stopped in step 38. If more glyphs are available in the list the method proceeds to step 46, where g is assigned to p (the previous glyph), and the next available glyph according to the page description is again assigned to g.

In step 48 it is determined whether p and g belong to the same strip based on their position. Two glyphs p and g are considered part of the same strip if their y coordinates are the same or differ only marginally, defined by a first predetermined tolerance value, and if the x coordinate of g is larger than the x coordinate of p, i.e., g is located to the right of p. As another condition, the horizontal distance between p and g must not be too large since otherwise p and g could be considered part of separate columns, and would therefore have to be included in separate strips. The upper tolerance value (second predetermined value) for the horizontal distance between p and g depends on the space box multiplied with a suitable factor. For common layouts, the factor can be chosen, for example, to be 4. Rotated or skewed glyphs are processed in a similar way as described in steps 134 to 138 below.

It is to be noted that for other languages that are written from right to left such as Hebrew and Arabic, the processing steps are adapted accordingly to account for the different processing direction. In these cases, g would be located to the left of p.

If p and g are determined to be part of the same strip based on their position, the method loops back to step 42. The combined strip information such as the geometry is buffered in a suitable manner. Otherwise the method proceeds to step 50 which tests whether glyphs p and g match some suitable condition for hyphenated words. This optional check requires the Unicode values corresponding to the glyphs on a page. The condition can be chosen dependent on the natural language comprising the text; a common condition would check whether p equals the hyphen sign and whether g represents a lowercase character since in most languages the part of a hyphenated word which is split to the next line does not start with an uppercase character. Using such a condition avoids incorrect classification of words combined with a dash character as a hyphenated word separated by a hyphen character. Such a misclassification could happen because in most page description languages the hyphen and dash (or minus) character cannot reliably be identified. If p and g do not match the conditions for hyphenated words the method proceeds to step 54, where the counter n is increased by 1. If step 50 established that p and g match the conditions for hyphenated words, the pair (p, g) is marked as a hyphenated pair in step 52. The method then proceeds to step 54. Again, from step 54 the method proceeds to step 34 to collect the glyphs for the next strip.

Creating Zones from Strips (Step 16)

A "zone" is a polygonal area on a page. Zone creation is based on the prior step of strip creation, and sequentially combines strips to zones based on their geometrical neighborhood. An exemplary method includes the steps illustrated in FIG. 5. Details on the steps are provided below.

Figure 5:
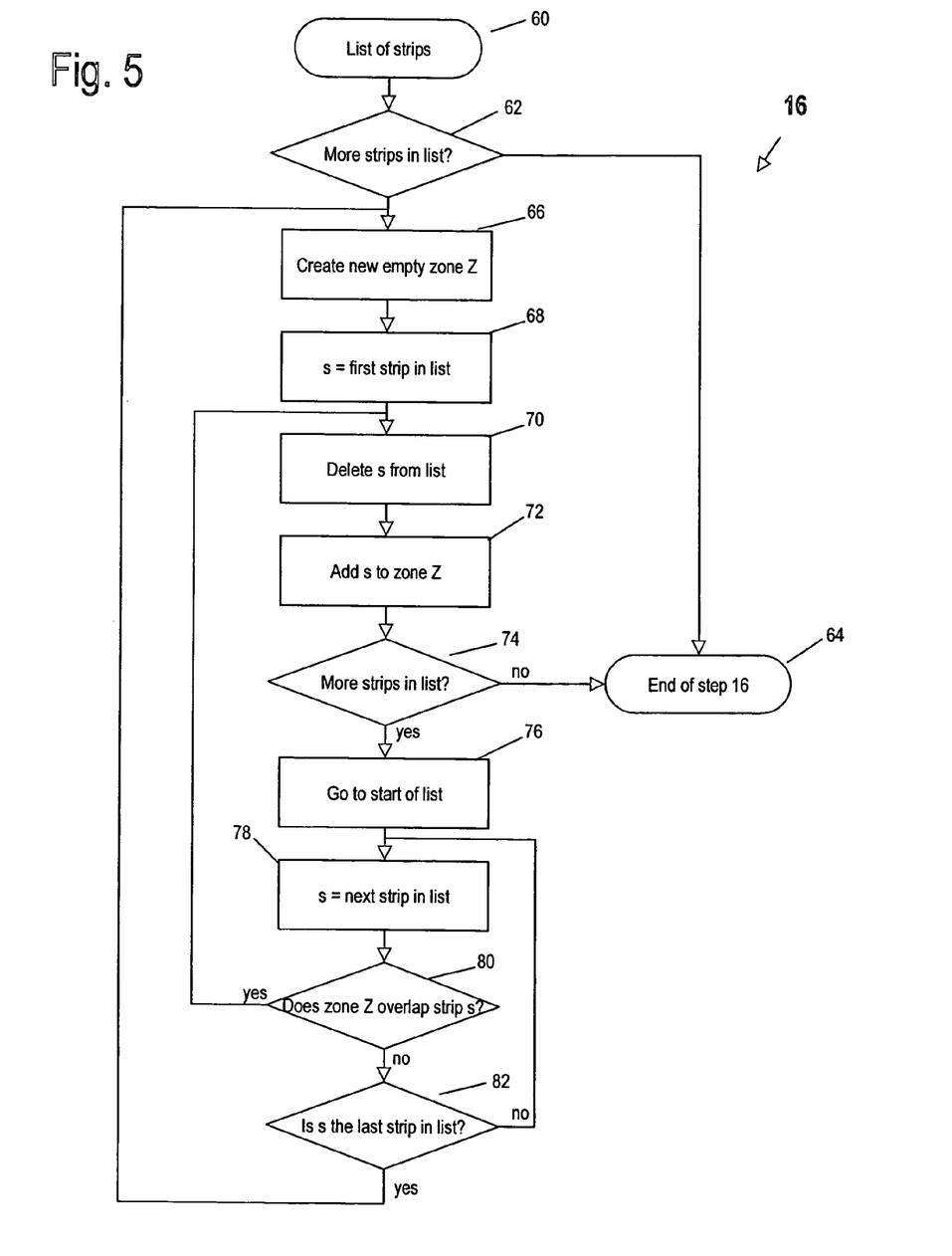
FIG. 5 shows a flow chart representing the detailed procedural steps for creating zones in step 16 of FIG. 3.

Step 60 starts with a list of strips comprising the text on the page. Step 62 tests whether there are more strips contained in the list. If no more strips are available the method stops at step 64. If more strips are available in the list, a new empty zone Z is created in step 66. In the next step 68, s is defined to be the first strip in the list. In the next step 70, the strip s is deleted from the list of strips, and in step 72 the strip s is added to zone Z. Step 74 determines whether there are more strips available in the list. If there are no more strips the method stops in step 64.

If step 74 establishes that there are more strips available in the list, the method proceeds to step 76 where it positions to the start of the list. In step 78, s is defined to be the next available strip in the list. Step 80 checks whether zone Z overlaps strip s based on the respective geometrical areas. If the intersection of both has an internal area which is different from 0, it is established that the strip is partially or fully contained in zone Z, and the method continues in step 70. The calculation of the intersection of geometrical areas may be implemented according to a method known to the person skilled in the art. If Z and s do not overlap the method proceeds in step 82 where it is determined whether s was the last strip in the list. If so, the method proceeds with step 66. If s was not the last strip in the list, the method proceeds with step 78.

Cleaning Up Zones (Step 18)

This part of the method improves the contents of each zone by determining word boundaries (grouping glyphs into semantic units), grouping and sorting the words according to their position, eliminating redundant text, and combining the parts of hyphenated words. This part of the method includes the steps illustrated in FIG. 6. Details on the steps are provided below.

Figure 6:
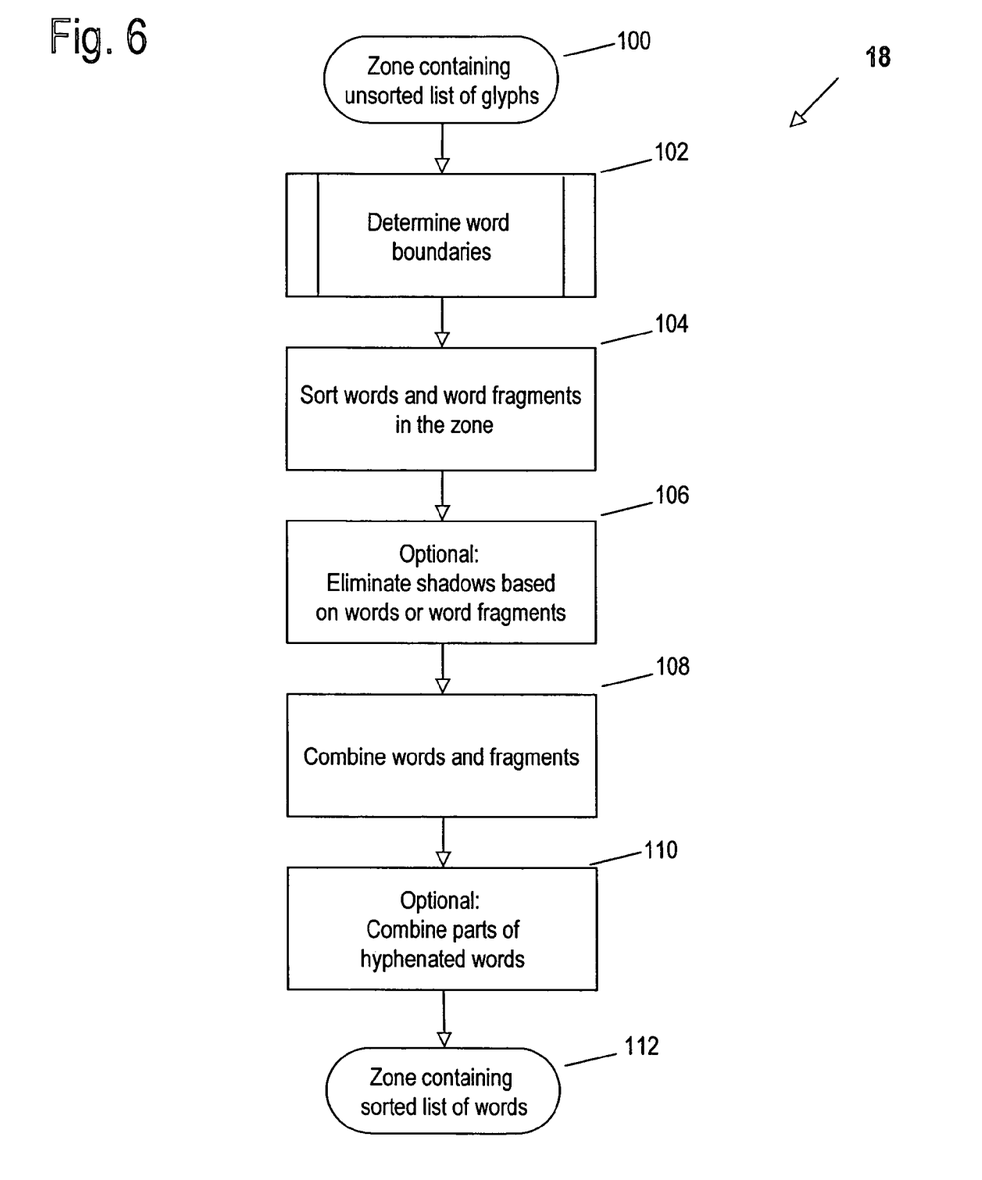
FIG. 6 shows a flow chart representing the detailed procedural steps for determining word boundaries and for the zone cleanup in step 18 of FIG. 3.

The method starts in step 100 with a zone containing a list of glyphs on the page where the glyphs are in no particular order. The zone is not empty since step 16 puts at least one strip, and therefore at least one glyph, into each zone. Step 102 determines word boundaries according to the steps illustrated in FIG. 7 and explained in more detail below. The result is a list of words and word fragments amended by the information of the word start and word end marks. The list contents are not guaranteed to contain full words yet since the parts of a word may be scattered across the page, and have to be combined later in step 108. In step 104 the contents of the list are sorted according to their y position. Two fragments with nearly identical y position are further sorted according to their x position. A suitable tolerance value for the decision after the comparison of the y positions may be half of the font size. However, other values may prove suitable for this calculation.

In step 106 redundant text based on words or word fragments is eliminated according to some well known method. Although shadows and other redundant text fragments on glyph basis may have already been eliminated in step 12, it is required to apply the process for eliminating redundant text again, this time operating on words or word fragments instead of glyphs. This is required since in some cases redundant fragments may be scattered over the page, and can only be identified after the word fragments have been sorted. As an alternative to this, optional step 12 operates on the unsorted list of glyphs.

In step 108 words and word fragments are combined if they are determined to be adjacent to each other. If the Euclidian distance between the last glyph of one fragment and the first glyph of the next fragment (possibly taking into account the character spacing value of the last glyph) is smaller than the space box, then the two fragments are considered parts of the same word, and are combined. As explained above, this step is required since parts of a word may be created out of sequence in the page description. Common examples are bold or colorized words which are created in a separate step after all the other text, and therefore do not appear in logical order on the page description.

In the optional step 110 the parts of hyphenated words are combined, and the hyphen character is removed. In order to achieve this, all hyphenated glyph pairs marked in step 52 are examined, and the word fragments containing the glyphs of the pair are combined to form a single word.

As a result of the just-described process, the zone contains a sorted list of words where corresponding parts of a word have been combined.

Determining Word Boundaries (Step 102)

This part of the method determines start and end marks for the words comprising the text on the page, based on the position of individual glyphs and (optionally) the corresponding Unicode values. The method includes the steps illustrated in FIG. 7. Details on the steps are provided below.

Figure 7:
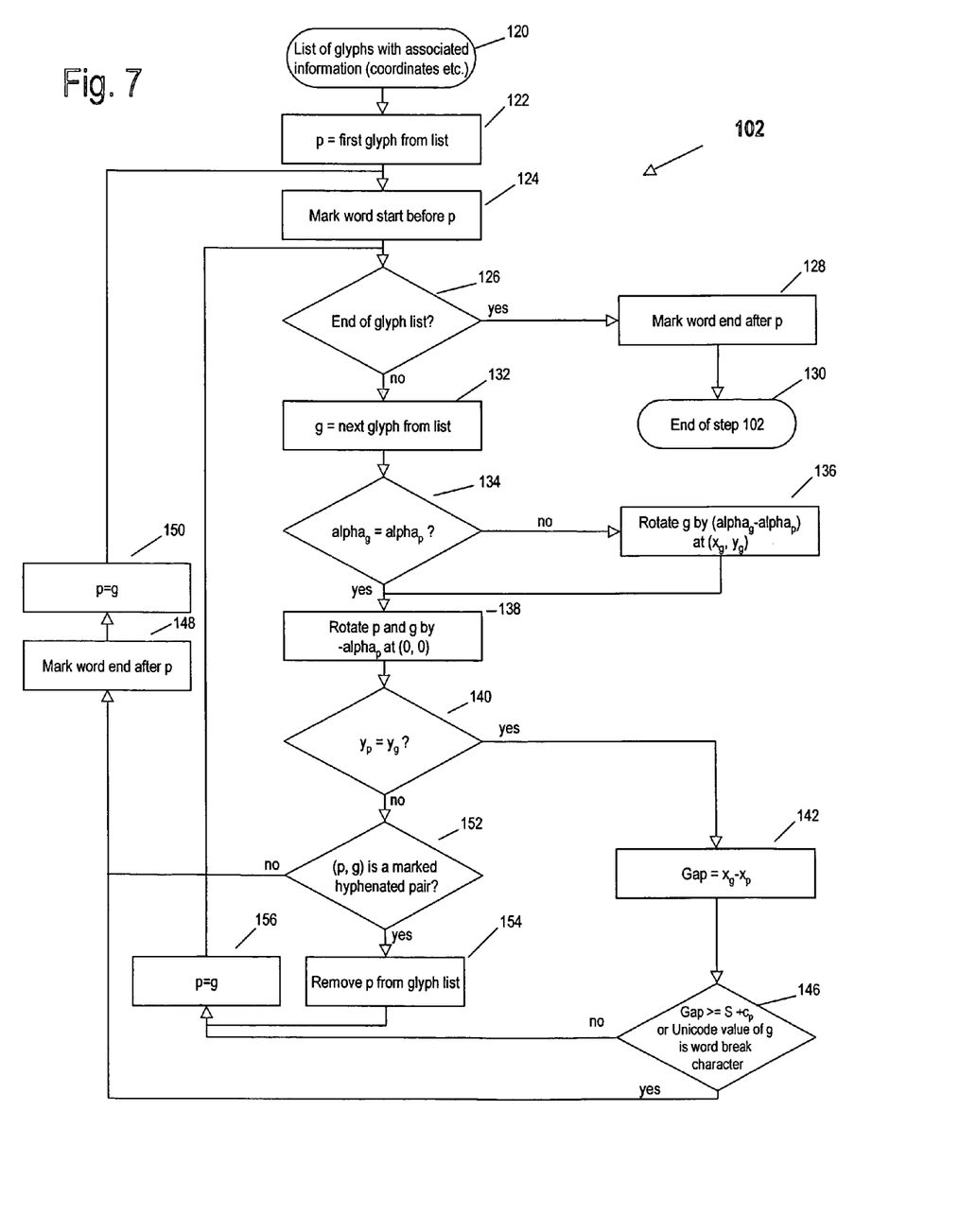
FIG. 7 shows a flow chart representing in more detail the procedural steps for determining word boundaries in step 102 of FIG. 6.

The method starts in step 120 by obtaining a list of glyphs with their associated coordinates on the page as well as the corresponding glyph widths and character spacing values. In step 122 p is assigned the first glyph in the list. In step 124 a word start marker is inserted before p. In step 126 it is determined whether the end of the glyph list has been reached. If so, the method proceeds to step 128. Step 128 inserts a word end marker after p, and the workflow stops in step 130. If the end of the glyph list has not been reached in step 126, g is assigned the next glyph in the list.

In step 134 the baseline angles of g and p are compared. If they are determined to be equal the method proceeds directly to step 138. If the baseline angles of p and g are different, g is rotated at its start point, using the difference of the baseline angles of g and p as the rotation angle. As a result, both p and g are oriented in the same direction. After this rotation the method proceeds to step 138.

In step 138 both p and g are rotated at the origin, using the negative of the baseline text angle of p as the rotation angle.

As a result, both p and g are now oriented horizontally, i.e., their baseline text angle is 0. As a result of the rotation steps 136 and 138, the method can determine word breaks even for curved or rotated text.

The method then proceeds to step 140 where it is determined whether the y coordinates of p and g are identical, or differ only by a small predetermined amount (third predetermined value). If so, the method proceeds to step 142. In step 142 the gap (white space) between p and g is calculated as the difference of the start x coordinate of g and the end x coordinate of p. The method then proceeds to step 146. Step 146 establishes whether the gap between p and g is large enough to be considered a word break. To achieve this, the gap is compared with the sum of the space box and a fourth predetermined value, e.g., the character spacing value of p. Taking the character spacing into account offers advantages for text which is emphasized by large character spacing (commonly used in German newspapers), since in this case the gap must be larger to be considered a word break.

Figure 9:
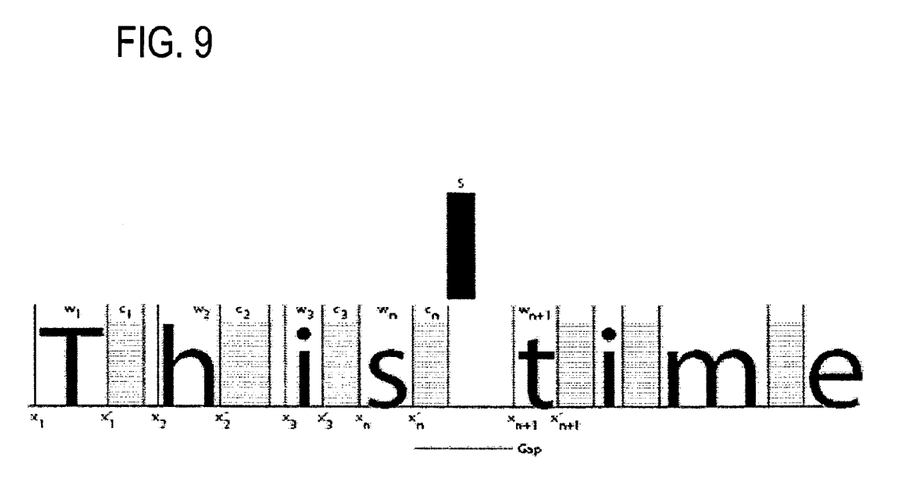
FIG. 9 shows the graphical details of another exemplary semantic unit with large character spacing.

Two text samples are illustrated in FIGS. 8 and 9. FIG. 8 shows a text fragment without additional character spacing, whereas FIG. 9 shows a text fragment with additional character spacing (large character spacing). In both figures the glyphs are marked with their start points $x_1, x_2, \ldots, x_n$ and their end points $x'_1, x'_2, \ldots, x'_n$ respectively. They have a glyph width $w_1, w_2, \ldots, w_n$. In the case depicted in FIG. 8, the space box s separates the words "This" and "time" with s exactly being the gap between the two words. FIG. 9 shows an additional character spacing $c_1, c_2, \ldots, c_n$ between adjacent glyphs and a gap between the two words which exceeds the sum of the space box s and the character spacing $c_n$ of the last glyph of the first word.

Using the above mentioned criterion yields very reliable results in both cases. Alternatively, if all Unicode values are available, a word break may also be established between p and g based on the Unicode values corresponding to both glyphs. The exact criterion for a Unicode-based word break is application-dependent. Typically, if g corresponds to a space character a word break would be created. Additionally, some applications may also create a word break if g corresponds to a punctuation character or any other predetermined separation character.

If either the geometric or the Unicode-based word break test determines that there is a word break between p and g the method proceeds to step 148. Otherwise the method proceeds to step 156.

If the y coordinates of p and g are determined to be different in step 140, the method proceeds to step 152. Step 152 checks whether p and g have been marked as a hyphenated pair in step 52. If so, the method proceeds to step 154. Otherwise it proceeds to step 148.

Step 154 removes p from the list of glyphs, and the method proceeds to step 156. Step 156 assigns g to p, and proceeds to step 126. Step 148 inserts a word end mark after p, and proceeds to step 150. Step 150 assigns g to p, and proceeds to step 124.

As a result of the just-described process, word start and end marks may be created to identify word boundaries.

The preferred embodiments as described above contain a multitude of steps that may seem partially redundant. However, experiments have shown that the number of particular processing repetitions and the corresponding order significantly improve the results of the method according to the invention. Therefore it is to be noted that although a certain number of processing steps has been described in the preferred embodiments, it may be preferable to omit or add one or a plurality of them depending on the refinement of the results desired. It may also seem appropriate to change the order of processing steps as described in the preferred embodiment depending on, e.g., the availability of Unicode values for all glyphs in a given electronic document or the like.

It is to be understood that the present invention can be implemented in various forms of hardware, software, firmware, special purpose processes, or a combination thereof. In one exemplary embodiment, the present invention can be implemented in software as an application program tangibly embodied on a computer readable program storage device. The application program representing the method may be uploaded to, and executed by, a machine comprising any suitable architecture.

Given the teachings of the present invention provided herein, one of ordinary skill in the related art will be able to contemplate these and similar implementations or configurations of the present invention.

What is claimed is:

1. A method of identifying semantic units in an electronic document comprising the steps of:
   a) providing an electronic document being described in a page description language, the document comprising at least one page having a plurality of text fragments, each text fragment including a plurality of glyphs that have not been identified as semantic units, the document further comprising geometric information including position and width of all text fragments on the page and page description language parameters of all glyphs, the parameters including at least one of font size, character spacing, and text distortion;
   b) determining a strip as a geometrical area of at least one glyph by comparing a geometric position of each glyph with a geographic position of the subsequent glyph in a description of the page, wherein every two glyphs are considered part of one strip if:
      I) the difference of their vertical coordinates is smaller than a first predetermined value; and if
      ii) the difference of their horizontal coordinates is greater than zero, and smaller than a second predetermined value;
   c) determining a zone of at least one strip wherein a zone is defined by the combined area of strips that overlap each other;
   d) determining a potential boundary between two semantic units in a zone by a process comprising the steps of:
      I) defining a list of glyphs in a zone according to their location in the page description with associated font characteristics and geometric position;
      ii) identifying the presence of a potential boundary between semantic units between two glyphs if the difference between the vertical coordinate of a selected glyph and the vertical coordinate of the preceding glyph is larger than a third predetermined value; and
      iii) defining a space box of rectangular shape for each font/encoding combination used in the document, the width of the space box being defined as the width of one of an existing and a hypothetical space glyph for the corresponding font size, and identifying the presence of a potential boundary between semantic units, if the distance between a selected glyph and the preceding glyph equals the width of the space box or exceeds it by a fourth predetermined value, thereby rendering a potential semantic unit; and iv) repeating steps I) to iii) until the end of the glyph list has been reached;
e) sorting the identified potential semantic units in the zone according to the vertical position and, if the vertical positions differ by at most a fifth predetermined value, according to the horizontal position, whereby a sorted list of potential semantic units is provided;
f) processing the sorted list of potential semantic units by combining two potential semantic units if the distance between the last glyph of a first potential semantic unit and the first glyph of a next potential semantic unit is smaller than the sum of the width of the space box and a sixth predetermined value, until the end of the list has been reached, thereby rendering a sorted list of finally identified semantic units in the zone; and
g) repeating steps d) to f) until all zones have been processed.

2. A method of identifying semantic units according to claim 1, wherein step a) further comprises providing an electronic document comprising Unicode values for all glyphs.

3. A method of identifying semantic units according to claim 2, wherein step d) further comprises classifying a Unicode value of each glyph, and identifying the presence of a boundary between semantic units in a sequence of a first, second and third glyph between the first and said third glyph whenever a Unicode value of the second glyph implies a boundary between semantic units.

4. A method of identifying semantic units according to claim 2, further comprising the step of identifying a first and a second glyph as part of a semantic unit, if the first glyph is a Unicode value representing a separator sign, and the second glyph represents a lower case character.

5. The method according to claim 4, wherein the separator sign is a hyphen.

6. A method of identifying semantic units according to claim 1, further comprising between step d) I) and d) ii) the steps of:
    comparing the two baseline angles of a selected and a next glyph; and
    rotating the next glyph, if both baseline angles are different, by an angle determined by the difference between both baseline angles.

7. A method of identifying semantic units according to claim 1, wherein in step d) iii) the calculation involves the sum of the space box determined for the font/encoding combination of the preceding glyph and the character spacing value of the preceding glyph.

8. A method of identifying semantic units according to claim 1, wherein in step d) iii) the distance between a selected glyph and the preceding glyph is calculated between a start point of the selected glyph and an end point of the preceding glyph.

9. A method of identifying semantic units according to claim 1, wherein step d) iii) further comprises inserting a start marker before the preceding glyph, and inserting an end marker after the preceding glyph depending on the result of the boundary identification.

10. A program storage device readable by a computer, tangibly embodying a program of instructions executable by the computer for identifying semantic units in a portable electronic document, the program including the steps of:

a) providing an electronic document being described in a page description language, the document comprising at least one page having a plurality of text fragments, each text fragment including a plurality of glyphs that have not been identified as semantic units, the document further comprising geometric information including position and width of all text fragments on the page and page description language parameters of all glyphs, the parameters including at least one of font size, character spacing, and text distortion;
b) determining a strip as a geometrical area of at least one glyph by comparing a geometric position of each glyph with a geographic position of the subsequent glyph in a description of the page, wherein every two glyphs are considered part of one strip if:
    I) the difference of their vertical coordinates is smaller than a first predetermined value; and if
    ii) the difference of their horizontal coordinates is greater than zero, and smaller than a second predetermined value;
c) determining a zone of at least one strip wherein a zone is defined by the combined area of strips that overlap each other;
d) determining a potential boundary between two semantic units in a zone by a process comprising the steps of:
    I) defining a list of glyphs in a zone according to their location in the page description with associated font characteristics and geometric position;
    ii) identifying the presence of a potential boundary between semantic units between two glyphs if the difference between the vertical coordinate of a selected glyph and the vertical coordinate of the preceding glyph is larger than a third predetermined value; and
    iii) defining a space box of rectangular shape for each font/encoding combination used in the document, the width of the space box being defined as the width of one of an existing and a hypothetical space glyph for the corresponding font size, and identifying the presence of a potential boundary between semantic units, if the distance between a selected glyph and the preceding glyph equals the width of the space box or exceeds it by a fourth predetermined value, thereby rendering a potential semantic unit; and
    iv) repeating steps I) to iii) until the end of the glyph list has been reached;
e) sorting the identified potential semantic units in the zone according to the vertical position and, if the vertical positions differ by at most a fifth predetermined value, according to the horizontal position, whereby a sorted list of potential semantic units is provided;
f) processing the sorted list of potential semantic units by combining two potential semantic units if the distance between the last glyph of a first potential semantic unit and the first glyph of a next potential semantic unit is smaller than the sum of the width of the space box and a sixth predetermined value, until the end of the list has been reached, thereby rendering a sorted list of finally identified semantic units in the zone; and
g) repeating steps d) to f) until all zones have been processed.

* * * * *